United States Patent
Tafoya (12)

(10) Patent No.: US 6,834,274 B2
(45) Date of Patent: Dec. 21, 2004

(54) BUILDING A LEARNING ORGANIZATION USING KNOWLEDGE MANAGEMENT

(76) Inventor: Dennis W. Tafoya, 1 Gwen La., Devon, PA (US) 19333

(*) Notice: Subject to any disclaimer, the term of this patent is extended or adjusted under 35 U.S.C. 154(b) by 445 days.

(21) Appl. No.: 10/041,023

(22) Filed: Jan. 7, 2002

(65) Prior Publication Data

US 2003/0130974 A1 Jul. 10, 2003

(51) Int. Cl.[7] ............................................. G06F 17/00
(52) U.S. Cl. ........................................................ 706/50
(58) Field of Search ............................................ 706/50

(56) References Cited

U.S. PATENT DOCUMENTS

| | | | |
|---|---|---|---|
| 5,355,445 A | 10/1994 | Shibao et al. | 706/50 |
| 5,905,989 A | 5/1999 | Biggs | 707/104.1 |
| 5,924,072 A | 7/1999 | Havens | 705/1 |
| 6,038,560 A * | 3/2000 | Wical | 706/50 |
| 6,269,355 B1 | 7/2001 | Grimse et al. | 706/46 |
| 2004/0010484 A1 * | 1/2004 | Foulger et al. | 706/50 |

* cited by examiner

Primary Examiner—George B. Davis

(57) ABSTRACT

A knowledge management database system and method for building such a system relies on input from various subject matter experts to review and validate the structure of the database (in terms of substantive subject matter areas included in the database, their definitions, focus) and the various items stored in the database. The review and validation renders the database as "easy to use" by a novice in the particular situation, allowing that user to easily navigate through the database system and find a response to a particular issue or problem. Such a database management system is particularly useful in a large organization, or one with rapid turnover in certain jobs, allowing a user who may be unfamiliar with various aspects of a particular issue to readily find the relevant information.

23 Claims, 14 Drawing Sheets

*Fig. 3*

| HR Business Categories | Activities, processes, events, ideas, laws, sciences or conditions associated with the category. | | |
|---|---|---|---|
| | Strategy & Plans (Who/Why/What) | Design & Development (Where/When/How) | Implementation & Evaluation |
| 1. Staffing Category Focus: The bringing of individuals into a company and its culture and their migration after entry. | Hiring plans, job definition/design, transfers, contractors and temps | Screening (e.g., drug or skill testing), relocation, orientation programs. | Recruiting, interviewing, hiring, diversity, bias/discrimination |
| 2. Compensation Category Focus: The design and distribution of wages, incentives for performance. | Compensation plans, incentives | Job descriptions, salary surveys, exempt/non-exempt, commission, stock | Wages and salaries, overtime, holiday pay, equal pay for equal work |
| 3. Benefits Category Focus: The design and distribution of assistance or assistance programs | Benefit plans, Insurance (health/life/disability), | Holidays, leaves, employee assistance programs, recognition/rewards, vacation, picnics/dinners, | Recreation, day care |
| 4. Training & Development Category Focus: Strategies and tactics for facilitating growth, development and/or advancement. | Succession plans, career paths, competency goals | Training, coaching, distance learning, mentoring, on-the-job training, internships, tuition reimbursement, | Promotion rates, learning curves, productivity, glass ceilings |
| 5. Environment Category Focus: The physical, cognitive, emotional climate, conditions and/or circumstances, which define the workplace. | Disaster planning, organization culture makeup, health/wellbeing planning | Safety/security/health programs, telecommuting, ergonomic monitoring | Retention, workplace violence, workplace accidents, turnover |
| 6. Employee Relations Category Focus: The management of inquiries, complaints, allegations associated with the workplace. | Employee relations plans, policies and procedures | Performance review, open door policies, performance management, complaint management, dispute resolution | Job actions/strikes, unions, affirmative action |
| 7. Organization Development Category Focus: The activities, processes and theories associated with improving or advancing people, business or management processes, material or technologies in the workplace. | Strategic planning, business planning, quality and service delivery plans | Reengineering, change, program evaluation | Best practices, work flows, benchmarking, process improvement |
| 8. Separation Category Focus: The departure from a job, position or the company for a defined period of time. | Termination, resignation, retirement | Firing, death, suspensions, outplacement, downsizing, | Absences, confidentiality, wrongful discharge, exit interviews |
| 9. Information Management Category Focus: The people, processes, materials and technologies associated with the flow and processing of information | Human Resource Information Systems (HRIS), information management | resume tracking, email, meetings, employee publications & communications, employee surveys, | Knowledge management, best known methods (BKMs), database security/management |
| 10. Compliance Category Focus: The conformity and adherence to rules, regulations, policies and procedures and the assessment and management of risk. | Workplace regulations, state and government regulations | Audits, data collection, (1-9), reports, complaint management, compliance monitoring (e.g., OSHA) | Government reporting, employment practices |

Fig. 4

| | Novice | Intermediate | Expert |
|---|---|---|---|
| High Sense of Urgency. Emphasis on action. (I/we will get on it right away. If we don't know what to do we'll find out or get help.) | | | |
| Moderate Sense of Urgency. (If I/we have the time, resources, etc. we'll get on to it. I'm not sure we know what to do.) | | Risk Level of the Issue or Problem | |
| Low Sense of Urgency (We don't have time or it's a low priority. Shouldn't someone else be doing this?) | | | |
| | Novice | Intermediate | Expert |
| | Little technical knowledge or practical experience. Needs direct, sometimes continuous guidance or coaching.... | Has some foundation that reflects a mixture of a skills and competencies. Capable of handling a variety of situations. Can learn on the spot with greater accuracy and less risk than the novice by building off past experiences. Needs limited direct supervision, and then often consultative.... | Possesses technical knowledge and or practical experience concerning the issue in questions Are able to take a detached view, minimizing personal biases and preferences. Able to synthesize and conceptualize key issues defining or addressing the matter at hand, to take a holistic view, to perceive emerging themes associated with events, data, and other's opinions, attitudes or beliefs.... |

*Fig. 6*

| *1. Staffing* |||||||
|---|---|---|---|---|---|---|
| Category Focus: The bringing of individuals into a company and its culture and their migration after entry. |||||||
| Representative Scope: Hiring plans, job description, definition and design, transfers, contractors and temporary employees; screening (e.g., drug or skill testing), relocation, orientation programs; recruiting, interviewing, hiring, diversity, bias or discrimination. |||||||
| Business Services | Consultants | Professional Associations | Trainers, Schools & on-line Learning | Articles & Books | Government Agencies & Compliance issues | Tools & Examples |
| Adverse effect. A condition created in a working environment when the selection rates and/or business processes (for hiring, promotions, etc) work to the disadvantage of an applicant's group, particularly groups classified as protected classes (e.g., because of race, sex, age and other characteristics.) Practices that discriminate against these groups are prohibited by law. |||||||
| Affirmative action. A guideline managed through the U.S. Equal Employment Opportunity Commission, to help employers assure that all candidates for a job receive fair and equal consideration and are not discriminated against because of race, sex, religious preference or other civil rights. |||||||
| Business Services | Consultants | Professional Associations | Trainers, Schools & on-line Learning | Articles & Books | Government Agencies & Compliance issues | Tools & Examples |
| Behaviorally anchored rating scales. Rating scales used in selection and performance review processes to measure specific behaviors or categories of behaviors associated with the job to be done. The process of using behaviorally anchored scales is a tactic or means for gauging how an individual might handle or behave in a particular situation (e.g., related to "customer service," "safety" or the like.) Want more information about this topic? |||||||
| Business Services | Consultants | Professional Associations | Trainers, Schools & on-line Learning | Articles & Books | Government Agencies & Compliance issues | Tools & Examples |
| Core job accountabilities. Ideas or concepts that defines the "musts" (vs the "preferreds") associated with a job. Core job accountabilities typically reflect the four or five key areas of responsibility that are associated with all jobs. For example, "quality" or "customer service" is one of the "must" categories for a job. Want more information about this topic? |||||||
| Employment contracts. Agreements between an employer and employee that outline the details, terms or conditions of an employment relationship. |||||||

*Fig. 7*

| | Tools & Tips: Best Known Methods for Getting Things Done | Strategies, Plans & Maneuvers: Building a Knowledge Management Approach to Problems or Issues | Guides, Examples or Illustrations for Common Business Needs |
|---|---|---|---|
| *1. Staffing* Focus: The bringing of individuals into a company and its culture and their migration after entry. | (Things to Consider When Conducting Job Interviews) (Things to Consider When Defining Missions, goals and objectives) (Things to Consider When Designing a Span of Control) | (Strategic hiring plan) (Decision making strategies) | (3) (Job Descriptions) (Job Posting) |
| *2. Compensation* Focus: The design and distribution of wages, incentives for performance. | (Things to Consider When Designing & building a compensation program) | (Communicating a compensation plan) | (1) (Salary surveys) |
| *3. Benefits* Focus: The design and distribution of assistance or assistance programs | (Things to Consider When Designing & building a benefits program) | (Communicating a stock program) (Designing an employee relations program) (Designing a telecommuting program) | (2) |
| *4. Training & Development* Focus: The growth, maturity and advancement of employees. | (Things to Consider When Conducting a Brainstorming Session) | (Career Development Plans) (Succession plans) | (4) (Training Evaluation forms) (Competency models) |
| *5. Environment* Focus: The physical, cognitive, emotional climate, conditions and/or circumstances, which define the workplace. | (Things to Consider When Managing turnover) (Things to Consider When Managing racism, sexism) | (Building a corporate wide safety program) (Building a customer service program) (Building a relationship management program) | (Accident report form) (Complaint forms) |

Fig. 8

|  | Strategy & Planning 6 | Design & Development | Implementation & Evaluation |
|---|---|---|---|
| A1. Staffing<br>Focus: The bringing of individuals into a company and its culture and their migration after entry. | C:<br>M: | C:1<br>M: | C:<br>M: |
| B2. Compensation<br>Focus: The design and distribution of wages, incentives for performance. | C:<br>M: | C:<br>M: | C:<br>M: |
| C3. Benefits<br>Focus: The design and distribution of assistance or assistance programs | C:<br>M: | C:<br>M: | C:<br>M: |
| D4. Training & Development<br>Focus: The growth, maturity and advancement of employees. | C:<br>M: | C:<br>M: | C:<br>M: |
| E5. Environment<br>Focus: The physical, cognitive, emotional climate, conditions and/or circumstances, which define the workplace. | C:<br>M: | C:<br>M: | C:<br>M: |
| F6. Employee Relations<br>Focus: The management of inquiries, complaints, allegations associated with the workplace. | C:<br>M: | C:<br>M: | C:<br>M: |
| G7. Organization Development<br>Focus: The activities, processes and theories associated with improving or advancing people, business or management processes, material or technologies in the workplace. | C:<br>M: | C:<br>M: | C:<br>M: |
| H 8. Separation<br>Focus: The departure from a job, position or the company for a defined period of time. | C:<br>M: | C:<br>M: | C:<br>M: |
| I 9. Information Management<br>Focus: The people, processes, materials and technologies associated with the flow and processing of information | C:<br>M: | C:<br>M: | C:<br>M: |
| J 10. Compliance<br>Focus: The conformity and adherence to rules, regulations, policies and procedures and the assessment and management of risk. | C:<br>M: | C:<br>M: | C:<br>M: |

*Fig. 9*

| Read the category names and descriptions below and use the scale to the right to rate the clarity of each's focus. | The category and focus are very good. It is a clear indicator of what one may expect to find in this category. | The category and focus are good indicators of what to expect. | The category and focus are poor indicators. They don't give a good idea of what to expect in this category. | The category and focus are very poor. They need to be rewritten in order to be more helpful, clearer. |
|---|---|---|---|---|
| *1. Staffing* Focus: The bringing of individuals into a company and its culture and their migration after entry. | | | | |
| *2. Compensation* Focus: The design and distribution of wages, incentives for performance. | | | | |
| *3. Benefits* Focus: The design and distribution of assistance or assistance programs | | | | |
| . . . | | | | |
| *8. Separation* Focus: The departure from a job, position or the company for a defined period of time. | | | | |
| *9. Information Management* Focus: The people, processes, materials and technologies associated with the flow and processing of information | | | | |
| *10. Compliance* Focus: The conformity and adherence to rules, regulations, policies and procedures and the assessment and management of risk. | | | | |

*Fig. 10*

8. Separation

Category Focus: The departure from a job, position or the company for a defined period of time.

Representative Scope: Termination, retirement, outplacement, downsizing, wrongful discharge, firing, death, absences, confidentiality, and suspensions

| Read the terms and definitions below and use the scales to the right to rate each for their accuracy, clarity, and appropriateness for the Separation Category. | On a scale ranging from 10 to 1, with 10 the highest, rate the *accuracy* of the definition provided for each term. | On a scale ranging from 10 to 1, with 10 the highest, rate the *clarity* of the definition provided for each term. | On a scale ranging from 10 to 1, with 10 the highest, rate the *appropriateness* of each term for the Separation Category |
|---|---|---|---|
| Absence. Excused or unexcused separation from work, or one's job. Absences may be planned or unplanned and of varying duration. | 10-9-8-7-6-5-4-3-2-1 | 10-9-8-7-6-5-4-3-2-1 | 10-9-8-7-6-5-4-3-2-1 |
| Absence rate. Amount of absence in the company as a whole or its departments. Absence rates can be calculated by the following formula from the U.S. Bureau of Labor Statistics (www.BOL.com) Absence rate = [work days lost (e.g., per month) / (average number of employees)* (number of days worked)] * 100 | 10-9-8-7-6-5-4-3-2-1 | 10-9-8-7-6-5-4-3-2-1 | 10-9-8-7-6-5-4-3-2-1 |
| Attrition. Reduction in the size of a workforce through normal processes, such as voluntary resignation, retirements, discharges for cause, transfers and death. | 10-9-8-7-6-5-4-3-2-1 | 10-9-8-7-6-5-4-3-2-1 | 10-9-8-7-6-5-4-3-2-1 |
| Desired termination. Separation from the company, for example, discharge for "cause," as a disciplinary tactic. | 10-9-8-7-6-5-4-3-2-1 | 10-9-8-7-6-5-4-3-2-1 | 10-9-8-7-6-5-4-3-2-1 |

*Fig. 11*

Title:
Author:
Citation:

| What is it? Origins? | Why is it used? Why should I care? | Applications? Where is it typically used? |
|---|---|---|
| Timing? When is it used | Who can use it? | What should you see from using this? P/O/Is? What changes? |
| Does it require to implement or use? | How do you do it? | How do I know it was worth using? |

EXAMPLE:

*Fig. 12*

ARTICLES:

| SUBJECT | HRHelpUSA Category | Primary Applications |
|---|---|---|
| Professional Development | Training & Development | Career planning<br>Professional Development<br>Mentoring |
| TITLE: "When your star performer can't manage ||| 
| AUTHOR(S): Gordon Adler ||| 
| JOURNAL: Harvard Business Review ™ ||| 
| DATE, VOL. PAGES: July-August, 1997. Vol 75, no. 4, p. 22 ||| 
| COMMENTS OR REVIEW: A classic problem in sales and technical departments: an excellent individual performer gets promoted to a management position without have skills, the experience, or, perhaps interest in being a manager. The article ends with a summary of different suggestions on how to manage this type of situation. ||| 
| TO ORDER: | www. hbsp.harvard.edu<br>617-783-7500 | |

BOOKS:

| SUBJECT | HRHelpUSA Category | Primary Applications |
|---|---|---|
| Mentoring | Training & Development | Career planning<br>Professional Development<br>Mentoring |
| TITLE: Mentoring ||| 
| AUTHOR(S): Gordon Shea ||| 
| PUBLISHER: Crisp Publications ||| 
| ISBN: 1-56052-123-6 ||| 
| COMMENTS OR REVIEW: A quick, inexpensive overview of mentoring. A good place to start. ||| 
| TO ORDER: | www.crisplearning.com | |

PROFESSIONAL SERVICES (Recruiters, Lawyers)

| HRHelpUSA Staffing Category<br>Business Services: Lawyers |||||
|---|---|---|---|---|
| Business Name: | Geographic<br>Service Area(s): | Specialization(s): | Additional<br>Services: | Contact<br>Information<br>: |
| | | | | |
| | | | | |

*Fig. 13*

| HR Business Categories | Activities, processes, events, ideas, laws, sciences or conditions associated with the category. |
|---|---|
| *1. Staffing* <br> Category Focus: The bringing of individuals into a company and its culture and their migration after entry. | Representative Scope: Hiring plans, job definition/design, transfers, contractors and temporary employees; screening (e.g., drug or skill testing), relocation, orientation programs; recruiting, interviewing, hiring, diversity, bias or discrimination. |

Sample
Tips & Tools Worksheet:

Developing Best Know Methods for Getting Things Done

| Topic: | | | | | |
|---|---|---|---|---|---|
| STRATEGY & PLANNING PHASE | | | | | |
| Step | Representative Activities/issues/Questions | | Objective | | |
| 1. Project Plan, Problem Definition, Identify Your Mission & Goals, Ownership | | | | | |
| 2. Research & Fact Finding | | | | | |
| 3. Problem Statement Define Strategy | | | | | |
| DESIGN & DEVELOPMENT PHASE | | | | | |
| 4. Root Cause/Issue Identification & Data Collection, BKM's | | | | | |
| 5. Solution Finding and Evaluation Plan & Timeline | | | | | |
| 6. Implementation Plan & Tactics, Approvals | | | | | |
| 7. Communication and Information Management plans & activity | | | | | |
| IMPLEMENTATION & EVALUATION PHASE | | | | | |
| 8. Change & Reengineering | | | | | |
| 9. Action and Performance Management | | | | | |
| 10. Evaluation, CI & New BKM's | | | | | |
| Want more information about this topic or example? | Contact: HRHelpUSA.com or | Trainers, Schools | Articles & Books | Govt. Agencies & risk issues | Glossary & Examples |

BUILDING A LEARNING ORGANIZATION USING KNOWLEDGE MANAGEMENT

TECHNICAL FIELD

The present invention relates to a methodology for building a learning organization using knowledge management in an iterative process of creating, updating and utilizing a knowledge database.

BACKGROUND OF THE INVENTION

Organizational learning can be defined as the development of "new knowledge" or insights that have the potential to influence all elements of an organization (e.g., business, school, firm, virtually any "organized" structure that creates and utilizes information), from the individual to the organization as a whole. Knowledge management can be defined as the processing (i.e., acquisition, learning and application) of information to benefit an organization. More than just receiving and acting on information, knowledge management assumes what is gathered and learned is communicated to others. All organizations are exposed to information; it is the organization's ability to facilitate the reception, processing, storing and distributing of knowledge that provides a competitive advantage.

Organizational learning is one particular "knowledge management" opportunity. Some learning is always a product of the interaction between new knowledge and the organization. In general, some organizations will be better at capturing, utilizing or benefiting from the "knowledge opportunities" than others. Information (i.e., potential knowledge) is shaped by the organization's culture. A culture can be defined in terms of internal structure, policies, routines, "ability to learn", sense of urgency, "learning styles", and can include external factors such as time constraints, partnerships, competitors, or new employees. Importantly, organization learning is also shaped by the quantity and quality of its existing knowledge.

New knowledge or information enters the existing organization either by plan or by accident. New knowledge may be the result of interaction with others (for example, contractors, joint venture participants), research, new technologies, or some combination of these channels.

In general, "knowledge management" is the process of putting information to work; to use knowledge management to improve the organization's profitability, productivity, quality and new processes (improved competitiveness), as well as to be better prepared to handle future knowledge opportunities when then come along.

Information can be both expensive and difficult for an organization to manage. In day-to-day activities important information can be overlooked, insufficient information can result in missed opportunities or incomplete information can lead to decisions based on incomplete or questionable assumptions. Costs associated with successful knowledge management have their benefits. The process of knowledge creation leads to an increase in the organization's intellectual assets. Sadly, however, current practices in most organization's means that such knowledge is often left in the head of the creator where it cannot be easily shared or, worse, is easily lost. Interest in capturing this important strategic resource has added importance to the study of "knowledge management."

Various tools are being developed to aid in the process of building a knowledge management system. U.S. Pat. No. 5,355,445 issued to K. Shibao et al. on Oct. 11, 1994 discloses a knowledge-based management system and method for managing a knowledge based system which includes a primary data storage section for storing received primary data. A change registration section records and indicates if and when the primary data have been changed. A data conversion section converts the primary data into secondary data that is compatible with the knowledge base system. This system also contains a secondary data storage section which stores the secondary data, and a reasoning calculation section to access the secondary data based on a received retrieval inquiry. A knowledge management section also controls the conversion section. Specifically, the knowledge management section controls the conversion section in order to convert the primary data corresponding to the secondary data that will be accessed by the reasoning calculating section, when the recorded change data indicates that the primary data corresponding to the second data to be accessed by the reasoning calculating section have been changed.

U.S. Pat. No. 5,924,072 issued to C. Havens on Jul. 13, 1999, discloses a knowledge management system which receives submitted knowledge items, maintains and provides access to the knowledge items, updates knowledge items as appropriate, prompts for and receives feedback relating to knowledge items, monitors various activity concerning knowledge items, and generates a variety of incentives to encourage desirable activities associated with knowledge items. A value may be determined for a knowledge item in accordance with a quantitative or qualitative evaluation of the usefulness, influence, or other impact of the knowledge item on the ability of users to perform their specified functions within an organization. U.S. Pat. No. 5,905,989 issued to D. Biggs on May 18, 1999 discloses a knowledge manager that relies on a hierarchical default expert system. This system includes a class hierarchical data base which may be appended without effecting the class hierarchy and which will address appended matter first (to supersede any previous knowledge in the class hierarchy data base of the system). In addition, the system's parameters of assets are appended to the system and are instantiated into objects that are then treated with an object-oriented paradigm. Thus, specific assets that are found throughout a plant may be defined as objects. These objects may be appended to the system without the proprietary information which they contain being disclosed to unauthorized personnel without them overriding, adding or deleting information to the class hierarchical database.

In each illustration of prior art discussed, the validity of knowledge data is not questioned. Thus, situations may arise where the retrieved data is incomplete or, worse, incorrect.

SUMMARY OF THE INVENTION

The need remaining in the prior art is addressed by the present invention, which relates to a methodology for building a learning organization using knowledge management in an iterative process of creating, updating and utilizing a knowledge database.

In accordance with the present invention, considerable time and effort is first spent building the knowledge data base based on a logical methodology and using teams of experts in each field to study, analyze and provide editorial comment to data entered in the data base. The data base model is structured to correspond to the archetypal stages, events or processes that shape the beginning and terminal activities associated with the organized complexity of business processes. Moreover, since the general patterns and functions that define these activities are the same from culture to culture the model is designed for application across situations, conditions or locations. Further, during each step of the process of using the database, an individual may pass through a series of evaluation steps to audit each particular step in the process. Further, the process is not considered as being a "straight line", or circular process that has an initial step and a final conclusion. Rather, the process is considered to be a "spiral" type of iterative process that is descriptive rather than prescriptive, that may be entered at any step, and the audit results of each step used to improve that step for the next user. In short, the database allows the user to move among elements of a cross-referenced but disintegrated grid structured to reflect the database subject. The system's goal is to facilitate the user's self-organizing responses to situations, regardless of the user's needs and competencies at different points in time or the issue at hand (from routine to complex). A general set of "best known method" audits appear at a concluding step to document the effort for historical, to maximize future, related knowledge management applications or, simply, to be used to re-work the process in general.

BRIEF DESCRIPTION OF THE DRAWINGS

Referring now to the drawings,

FIG. 3 includes a table with an example of the categories included in a database system, with a breakdown of three activity areas for each category;

FIG. 4 is graph illustrating the relationship between the "experience" level of the database system user and the "urgency" level of the problem/issue being researched;

FIG. 6 is an example of a page from a database built using the methodology of FIG. 5;

FIG. 7 contains a summary of library products, in terms of tools, strategies and maneuvers, associated with a subset of the category listing of FIG. 3;

FIG. 8 is a table illustrating the distribution of glossary terms for an exemplary database category across the three activity areas defined in FIG. 3;

FIG. 9 illustrates an exemplary rating guide to be used by subject matter experts in evaluating the definition and focus of the database categories;

FIG. 10 contains a form used for expert review of glossary terms in the database system;

FIG. 11 illustrates an exemplary template that may be used for adding a book or article to the database system;

FIG. 12 illustrates the format in which the information in FIG. 11 will be displayed to the user; and FIG. 13 illustrates an example of forms used to add "tips, tools and examples" to a database category.

DETAILED DESCRIPTION

Figure 1A:
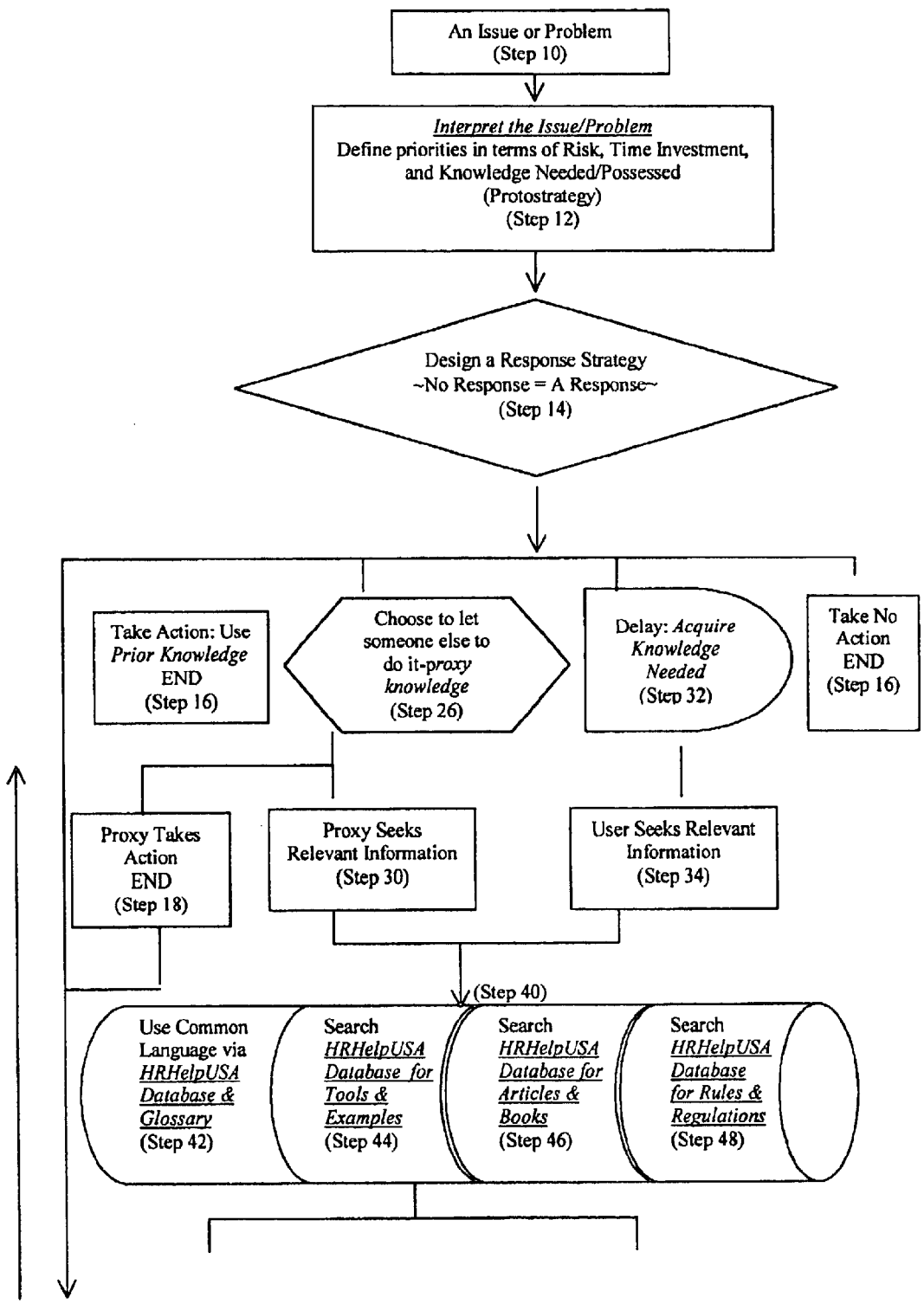
FIGS. 1A and 1B are a flowchart illustrating the utilization of a knowledge management database system, as a continuous process, in accordance with the present invention.
Figure 1B:
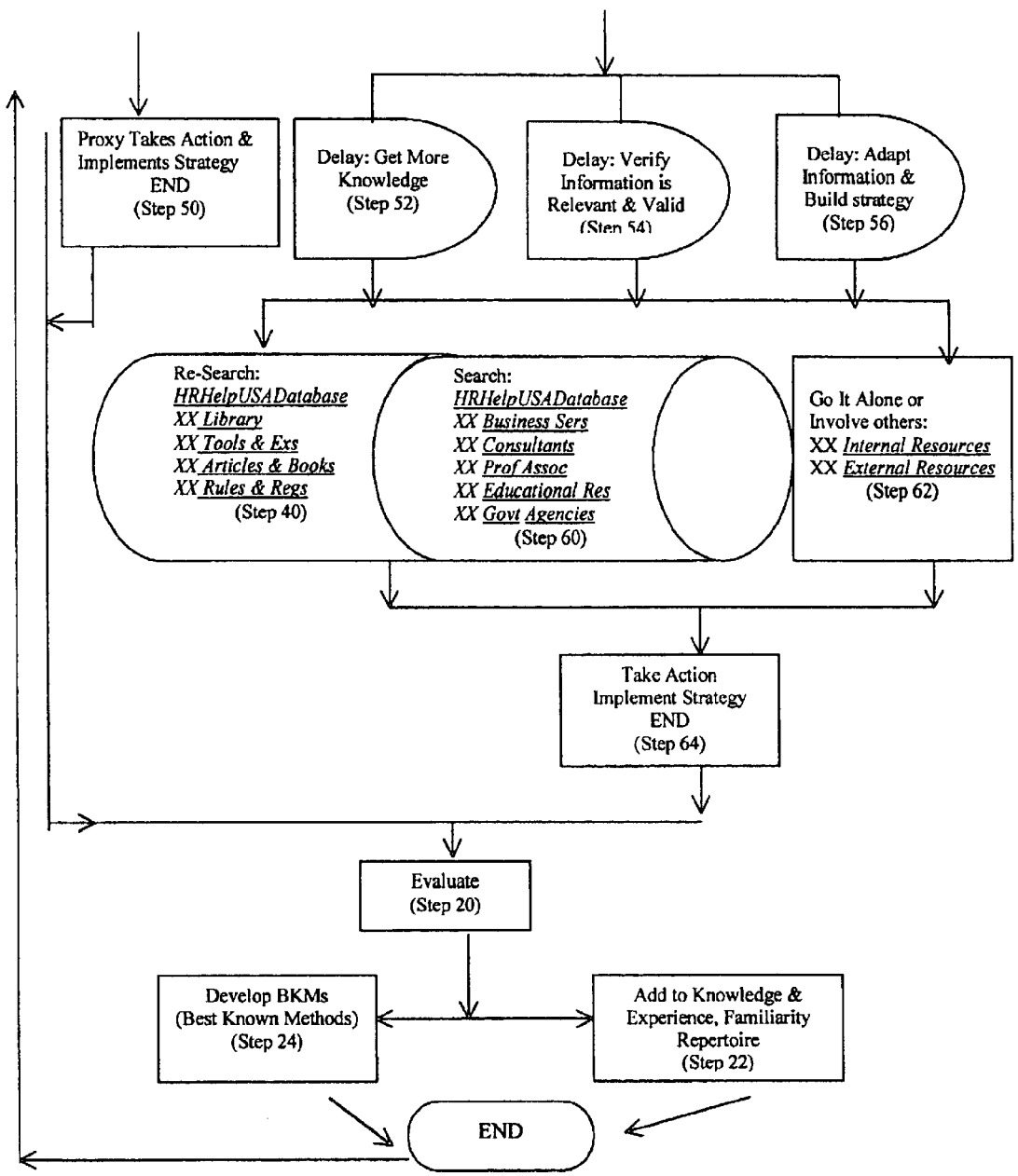

A preferred embodiment of the process flow for the knowledge management application of the present invention is illustrated in FIGS. 1A and 1B. As shown, the process begins with a user positing an issue or a problem (step 10) that requires resolution through the application of information. A protostrategy (step 12), developed around preliminary estimates of the issue/problem, is used to identify priorities and possible courses of action given estimates of risk, time investment and the knowledge needed/possessed (at a high level assessment) to solve the problem or address the issue. This marks the first decision point in the process (step 14): whether or not to go through the effort to respond to the issue/problem.

Several factors (e.g., cost and time-constraints or relative priority) can result in a decision to terminate the process ("take no action," step 16) at this point. Alternatively, the user may decide to generate a response based, simply, on prior experience or knowledge of the issue and ways to manage it (step 18). Again the user also chooses not to continue using the invention's knowledge management application letting perceptions of personal skills or experience serve as a foundation for formulating a response. As shown in FIG. 1B, action based on "prior knowledge" still brings the user to an evaluation step 20, which can be used to assess how successful the user was in resolving the issue/problem based, in this instance, on prior knowledge.

Learnings that are summarized in the evaluation can then be added to the knowledge, experience and familiarity repertoire for that issue/problem (step 22) and any "best known methods" (BKMs) can be updated (step 24) for communication to and use by others. Users acting on prior knowledge complete the evaluation step and exit the program.

Referring back to FIG. 1A, there remain two other alternative paths a user may take and use the invention's knowledge management application. In the first instance, the user uses another's knowledge, ("proxy knowledge"), to develop a solution. In the second, the user delays action until the needed knowledge is personally attained. Regardless of the choice, each can result in use of the expert data base system that has been developed. Regarding the first of these alternatives (shown in response to query step 14), a user may determine, as part of the protostrategy, that someone else (defined as a "proxy", as shown in step 26) is better suited to deal with the issue or problem. In this instance, determining to use a proxy's "subject matter expertise" provides a response to the issue/problem and, theoretically, increases the likelihood that appropriate action will be taken (step 28).

For example, if a particular hazardous chemical has been spilled at a construction site the project manager (the original user) who needs to provide for proper hazardous waste removal, may design a protostrategy that includes use of a haz-mat specialist (a proxy) to actually deal with the problem. Returning to the flow of FIG. 1A, the proxy then becomes involved in the process and, assuming the proxy needs no additional information/knowledge, proceeds to evaluation step 20. Before exiting and when appropriate the proxy completes their involvement with an evaluation of their effort and the addition of knowledge to the database and/or the generation of BKM's for future reference.

If the proxy does not immediately have a response to the problem/issue, the proxy may still be better suited to seek out the relevant information required to formulate the response (step 30) by using the invention's expert-created database system. If no proxy is used, the original user also may decide to use the database to develop a response but this is at the expense of a "quick response" since the prudent user must acquire knowledge before proceeding. (step 32). Taking either step 30 (proxy) or step 32 (user) enters the user (or user's proxy) into the flow of the actual knowledge management database system, which will now be described in considerable detail.

For the purposes of this example, it is presumed that the expert database system is a "human resources" database system, used by a large corporation, a multi-location company or any company/organization that has a relatively large number of employees and/or employee-related issues/problems. Moreover, since different individuals in the company may, at any given time, be responding to various issues, the use of the knowledge management data base system of the present invention allows for a more consistent and accurate response on the part of the database users.

Referring to FIG. 1A, and as will be discussed in detail below, a knowledge management database system 40 formed in accordance with the present invention comprises four major segments. These segments include a common language segment 42, comprised of definitions for terms associated with the problem/issue, alternative terminology related to the input terms, a glossary of terms, and the like; a tools and examples segment 44, which may include certain "forms" used in each particular aspect of the business, series of questions that may lead the user to a solution, examples of similar issues/problems and their responses, and the like; an articles and books segment 46, including references of interest to the subject matter at hand; and, a rules and regulations segment 48, which may include both internal "corporate" rules and regulations, as well as local, state and federal regulations and laws that are applicable to the subject matter.

Presuming that a "proxy" or user has utilized the knowledge management database system to collect additional information to form a response to the issue/problem, the user/proxy (hereinafter simply defined as the "user") may then decide to "take action" and implement a developed strategy, based on this collected information (step 50). Subsequent to this step, the user then enters the evaluation process, step 20, followed by adding to the knowledge base (step 22) and/or BKMs (step 24). As a result of the first search through database system 40, the user may decide to "delay" taking action for a variety of reasons as illustrated in steps 52, 54 and 56. These include (1) the need to acquire additional knowledge (step 52); (2) the need to verify that information is relevant and valid (step 54); or, (3) need to adapt the acquired information and build a strategy (step 56). In any case, the user in these "delay" examples will then re-search database 40, as shown in FIG. 1B. Additionally, the user may decide to search a supplemental database 60, where supplemental database 60 is still part of the original invention it is not designed to be in database 40 since it may be quite large, take a long time to search and, for most cases, not contain information that is immediately relevant for an initial database query. As shown in FIG. 1B, some of the source information contained in supplemental database 60 may be outside business services, consultants, professional associations, government agencies, and the like. It is presumed that the results of the first search database 40 will allow the user to refine the search for information on this pass, and provide the sufficient information needed to form a response to the issue/problem. A third alternative that the user may select at this point, illustrated in step 62, is to "go it alone", and while involving other internal/external resources the knowledge management database 60 is by-passed.

Regardless of the resource used to this point, the user then assimilates all of the accumulated information to implement a strategy and "take action" (step 64). As with the other action steps discussed above, after the user has taken the action, the process enters the evaluation step 20, leading the user to add to the organization's accumulated knowledge, experience and, familiarity repertoire (step 22) and/or to develop BKMs (step 24). Once all of this is accomplished, the flow reaches the ultimate conclusion and the process is exited (step 66).

Figure 2:
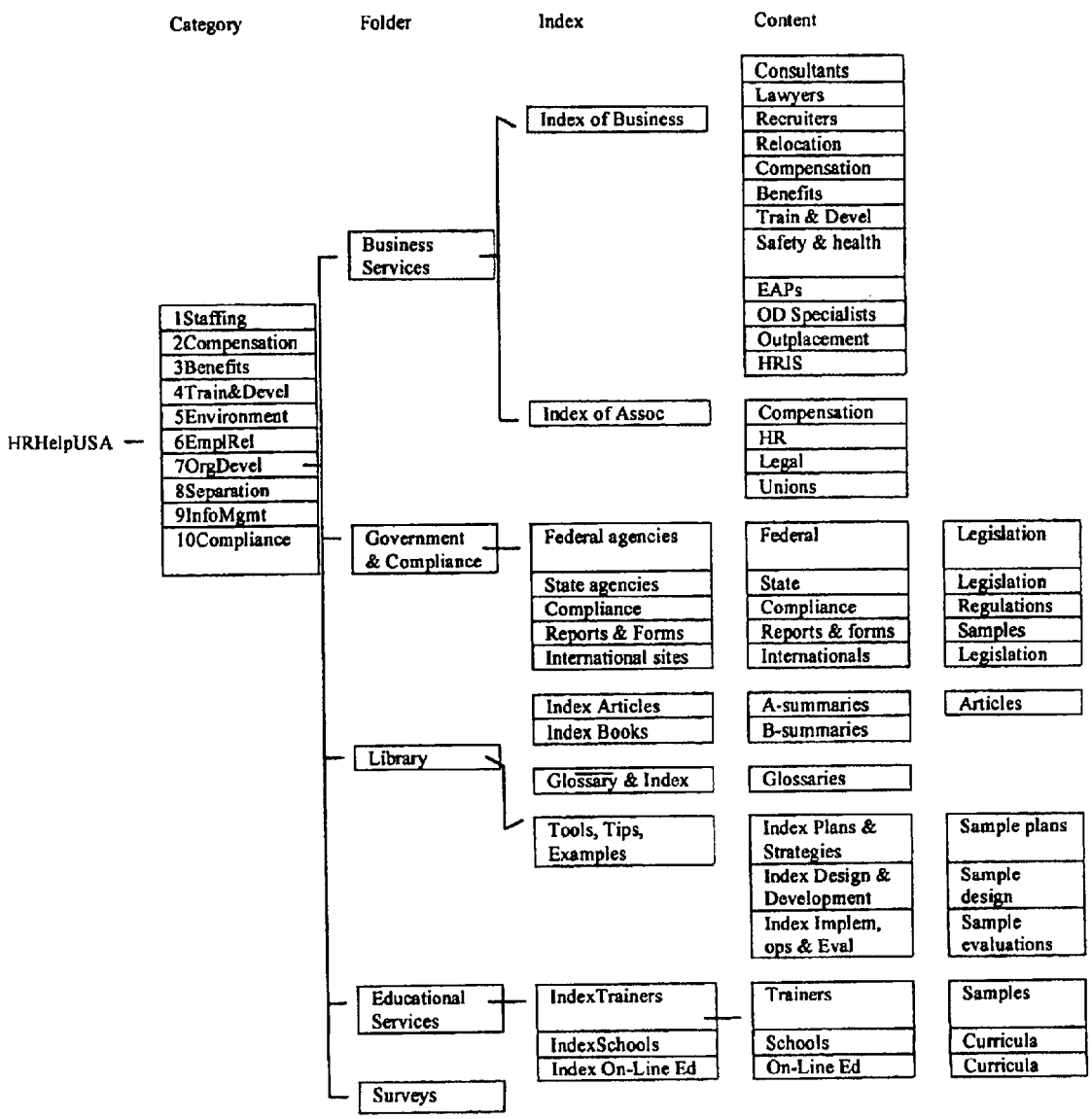
FIG. 2 contains a more detailed diagram illustrating the flow through a selected portion of a knowledge database created in accordance with the present invention.

The flow through an exemplary database 40 formed in accordance with the present invention is illustrated, in terms of a diagram, in FIG. 2. In this particular illustration, as noted above, a "human resources"/HR database will be used as a concrete example to aid in understanding the details of the database system of the present invention. As shown, an exemplary HR database 40 comprises a set of 10 different categories that will be "searchable" when the user enters database 40: staffing, compensation, benefits, training and development, environment, employee relations, organization development, separation, information management, and compliance. The user will select the category most applicable to the issue/problem at hand (or the category that seems most relevant at this time) which, in turn expand into a number of information "folders" that the user can search for more detailed the information. (It is to be understood that the "categories" and "folders", as the other steps along the database flow, will be visible on the computer screen or other device used to retrieve the desired information).

Referring back to FIG. 2, the "organization development" category has been selected, opening up a set of folders defined as "business services", "government and compliance", "library", "educational services", and "survey". The user then determines, using his best judgment, the most likely area to research to find relevant information for the problem/issue at hand. Each folder contains an index that provides additional information regarding the types of data contained in that folder, with the content of the folders (by headings) also listed in FIG. 2. In one example, if the user was looking for training information for new hires in a secretarial pool position, the user would search through "educational services", looking through the "trainers" index and reviewing the profiles stored in this part of the database until appropriate training information was found.

FIG. 3 illustrates, in general terms, a table including a sample of the ten HR categories defined above, a "category focus" for each category, and a set of activities, processes, events, ideas, laws, sciences or conditions associated with each category, broken down into three major areas: (1) strategy and plans (who/why/what); (2) design and development (when/where/how); and (3) implementation and evaluation. This breakdown of activities into three major areas will be referred to again during the discussion of building the database, such as in determining the number of glossary items to include in each area of each category.

In general, manager's are charged with making the day more productive for all workers and to do things that grow the business while reducing time spent in non-value-adding activities: for example, chasing problems or pushing bureaucracy and paperwork. The present invention's information management system helps users manage their environment by helping them accurately identify the risk in the environment, assign the proper orientation or "sense of urgency" to their problems and to develop the skills needed to take appropriate action once risk and orientations are established. The dynamic balance among these three states reflect the theoretical foundation of this invention and are described in FIG. 4.

The abscissa of FIG. 4 contains three "rough" levels of worker experience or competence: "novice", "intermediate", and "expert". A "novice" worker can be defined as having little technical knowledge or practical experience in a current job assignment. Such a worker may need direct, sometimes continuous, guidance or coaching. A "novice" may be unable to act alone, except on the most mundane matters. At the next level, a worker with "intermediate-level" competencies is a mixture of skills and competencies. The "intermediate" skill level worker may be capable of handling a variety of situations on his own or can learn quickly, almost on the spot, and with greater accuracy and less risk than the novice. This is due, in part, to the fact that those at the intermediate level have something to build off of, be it past experiences, education, or even a mentor.

Thus, an individual with intermediate-level skills and competencies needs limited supervision, and then more of a consultative nature. By virtue of time spent in a particular assignment, an "intermediate" worker may acquire an expertise in one or more areas. Advancing beyond the intermediate level the individual moves into the highest category of worker, the "expert." An "expert" is expected to possess the technical knowledge, know how and/or practical experience needed to address the issue/problem in question.

Typically the expert is able to take a detached view, minimizing personal biases and preferences, associated with the problem under review. He is also able to synthesize and conceptualize key issues defining the matter at hand and is often able to take a "holistic" or system view of the situation. All of this makes the expert better able to perceive emerging themes associated with events, data, and another's opinions, attitudes or beliefs.

Finally, experts are communicators in the truest sense of the word. They may not speak as well as others but they can transfer meaning and carry out a dialogue with other experts, including representatives of different disciplines or opinions. Importantly, the experts are prepared to admit ignorance, uncertainty or error in their own personal knowledge base.

The ordinate of the graph in FIG. 4 similarly lists three separate "urgency states" ("low", "medium" and "high") that reflect orientations a manager can assign or take to problems or issues faced. A manager might assign a "low urgency" rating (rightly or wrongly) to an issue when the time or money resources are low, the issue is just seen as a low priority and/or the manager believes someone else should handle the issue ("It's not my problem!"). Responding to a problem with a "moderate" sense of urgency might reflect an orientation defined by available resources, the desire to act but the sense someone else might be better qualified or it's a "relatively important" issue—something that merits attention.

Lastly, shaping an orientation to respond around a "high" sense of urgency implies that the issue, often in and of itself, is perceived as one of great, immediate importance. The rating may be mis-assigned, however, especially by one with limited experience or one with, for example, a bias for this type of issue. As in the case of someone who is particularly skilled at handling the issue so, in this instance, the sense of urgency is "inflated" vis a vis the costs of inaction or a poor response. On average, however, recognizing something as meriting a "high sense of urgency" is reserved for situations demanding an emphasis on action—something needs to be done right away and if the worker does not know how to do it, someone will be found to help. The minimal contribution of the knowledge management database system of the present invention is linked to its use as a means for augmenting, supplementing and/or improving on the resources currently available in an organization. More significant are the contributions to the user. Users can improve skills and competencies needed to manage a given issue, to identify the risk associated with a situation and, to better assess the orientation or "sense of urgency" that is most appropriate to respond to a situation.

Figure 5:
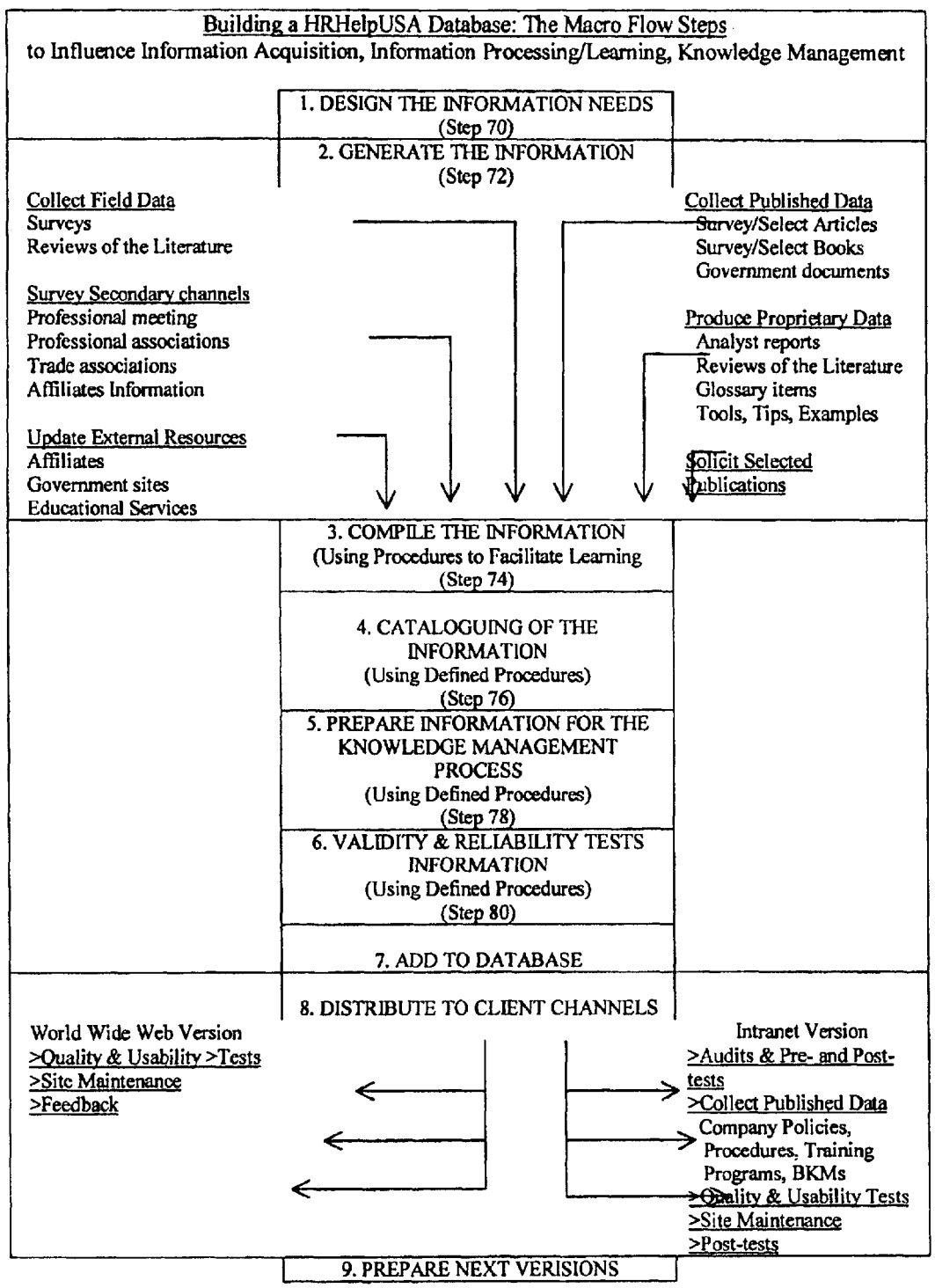
FIG. 5 contains a diagram illustrating an exemplary process of building a knowledge database in accordance with the present invention.

As mentioned above, a significant aspect of the present invention relates to the creation of the knowledge management database, and in particular, the use of expert review of each item that is compiled, catalogued and added to the database system. FIG. 5 illustrates, in a general flowchart, the steps involved in building an exemplary expert database in accordance with the present invention. The first step (step 70 in FIG. 5) is to design the information needs for the particular database being constructed. Identifying the database's information needs influences the user's information acquisition strategies, processing/learning styles and knowledge management practices. During this step, a set of task flow lists are developed for data base products: (1) information tools and their content (i.e., the distribution of content in terms of strategy and planning, design and development; implementation, operation and evaluation tools; (2) glossary content (similar boundaries); and (3) general library content.

Once the task flow lists for tool, glossary and library content have been developed, the database building process moves on to the "information generation" step (denoted as step 72 in FIG. 5). Various methods may be used to generate the initial, "raw" information that may ultimately be included in the database. For example, field data from surveys and reviews of the pertinent literature may be gathered as may published data and reviews from select articles, books, and government documents. These are primary research channels for the database. "Secondary channels" also are available, including reports from professional meetings or from professional associations or trade associations.

Where applicable, an organization's own proprietary data also can be incorporated into the database. This, as well as information from "external resources" such as affiliates, government sites and educational services helps "personalize" the database for an organization should that be part of their information management strategy.

Once all of the "raw" data is collected, it may be compiled and cataloged according to various formats, with one format used for "field data", another for "second channels", and a third for "published, proprietary or solicited data". Importantly, collection and compilation of information is completed by subject matter experts (step 74), using established protocols and agreed-upon procedures each designed to use and manage information that can facilitate learning. Moreover, the resulting compilation can be rendered as a micro-set of protocols for the "tools," the "glossary," and the "library".

With the various rules and protocols established, raw data are then catalogued (step 76), again using a set of defined procedures. Information is catalogued using a template that prescribes the distribution of the "tools," a content specific "glossary" and, finally, the make-up of the "library" across predetermined subject categories that correspond to the resource field (in this case Human Resources) being used.

The information is then prepared for the knowledge management process, step 78. In this step, the information is added to the database by category with relevant cross-referencing across other categories and information. This is an important, needed step to maximize the user's ability to search the database.

Once the database is populated with the information, validity and reliability testing is required (step 80), using a set of pre-defined validity and reliability testing procedures, forms and materials. The result of this testing produces a set of statistics rating the database's overall quality. If evaluation ratings are sufficiently high the information may be approved for addition to the database for use.

In general, various distribution channels may be used for the created database system. One channel would comprise a world wide web version, available through an external data link. This arrangement would allow for links to other external databases or sources of information to be included in the database. Alternatively, an organization may elect to utilize an "intranet" version of the database personalized for that organization and only accessible by those affiliated with the organization.

FIG. 6 illustrates an exemplary page from an "HR" database built using the above-described process of the present invention. This particular page is associated with the category of "staffing" and includes a "category focus," allowing the user to double-check that this particular category is indeed relevant to the current issue/problem. In this illustration elements of the glossary related to the "staffing category" are presented along with a more detailed description of the category's scope.

A summary of the library products in terms of tools, strategies and maneuvers, and forms associated with a subset of the above-defined database categories is shown in FIG. 7. For each category, a listing of library products is included. These products are broken down into three different subsets: (1) tools and tips (best known methods for getting things done); (2) strategies, plans and maneuvers (building a knowledge management approach to problems or issues); and (3) guides, examples or illustrations for common business needs.

A useful measure of the completeness of the database system can be determined by evaluating the "current" number of glossary terms in a category relative to the "minimum" number of terms that were pre-defined as being required. FIG. 8 illustrates a table associated with this concept. In particular, it has been found through separate analysis that approximately 40% of the total number of glossary terms should be found in the area of "strategy and planning", 30% of the total in the area of "design and development", and the remaining 30% in the area of implementation and evaluation. Thus, with 70% of the glossary terms associated with the "up front" elements of dealing with an issue or problem, the database is more likely to have the information required to provide an adequate response to the user.

As mentioned above, a significant aspect of the present invention is the process of utilizing a substantial amount of expert critiquing of the database structure and data items during the building process. In particular, various subject matter experts are used to review and evaluate each aspect of the database, thus improving the accuracy and reliability of both the data items and search results. In contrast, many knowledge management systems of the prior art allow for the users to self-enter information to the database, where this information may not always be accurate and may, in fact, give the wrong results during subsequent use of the knowledge management system. FIG. 9 illustrates an exemplary rating guide that may be used in accordance with the present invention. This particular sample is also associated with the HR example discussed above, and includes a partial listing of the 10 categories and the "focus" defined for each category.

During review by an expert in the field, each category and its focus are reviewed and assessed. This particular grid uses a set of four rankings for each category and focus: "very good", "good", "poor", and "very poor". The definitions given here are exemplary only, and other standards for ranking may also be used (such as a scale from 1–5, 1 being the poorest quality and 5 the best). Having a number of different experts review and evaluate the 10 categories enables the builder of the database to refine and modify (if necessary) category content and/or focus. This, in turn, helps improve the database's accuracy and reliability and, importantly, the database organization—a significant feature needed for users interested in searching the database.

Similarly, it is also important that for category glossary items to be useful they must be properly defined and have sufficient clarity. Again, a set of proper subject matter experts may be used to review and provide feedback on the glossary terms and definitions gathered from the raw data. FIG. 10 illustrates a rating form that may be used for the expert review of glossary items associated with the category of "separation". In this example, each glossary item definition is evaluated in terms of "accuracy", "clarity", and "appropriateness", using (in this particular example) a ranking between "10" and "1" (a "10" being the best rank and "1" the worst). The database builder can then use this information to modify any definitions, particularly if a large number of reviewing experts consistently give a particular item a low ranking.

FIG. 11 illustrates an exemplary template that may be used for adding an article or book to the database. The use of a common template will allow for database users to consistently find relevant information, presented in a systematic manner throughout the database. Besides requiring the bibliographical information, the template includes a set of (in this example) nine commentaries, allowing the reviewer to add substantive information to the bibliographic data. There is also a space for an "example" from the article/book, if appropriate.

FIG. 12 illustrates the format in which this information will be displayed to the user of the database system. FIG. 13 includes an exemplary format for adding "tips, tools and examples" to a database category, in this case, the "staffing" category. The worksheet is divided into the three issue/problem areas of "strategy and planning", "design and development", and "implementation and evaluation". Representative questions and objects may be proposed for the process steps associated with each category, as shown.

In summary, the inventive knowledge management application, program and database is a system that provides information related to situations particular to an organization, or one aspect of an organization. The example discussed above in terms of an "HR" database for use by a company is considered to be exemplary only, and used to describe the mechanics of the system, not to limit the substantive elements of the system. From the user's point of view, the system allows for those of various skill and knowledge levels to find relevant information for the issue/problem at hand. Indeed, a virtual encyclopedia of knowledge and information, as well as a directory of business and professional resources is put at everyone's fingertips, resulting in an more efficient managing of the day-to-day business and working environments.

What is claimed is:

1. A method of building a knowledge management database system for a known organization, the method comprising the steps of:

a) designing the information needs of the known organization;

b) collecting information from a plurality of different sources associated with said known organization to form a set of raw data for potential entry in the database system;

c) compiling the collected information using a predetermined set of protocols;

d) cataloguing the compiled information into a plurality of pre-defined categories particular to said known organization;

e) preparing the catalogued information for review by distributing each piece of information into a proper category;

f) reviewing category definitions and information items, using subject matter experts;

g) modifying category definitions and information items as a function of the review in step f) to form a set of reviewed information items; and h) adding reviewed information items to the database system to form a complete database system.

2. The method as defined in claim 1, wherein in performing step a), the method includes the steps of creating a task list flow for tool content;

creating a task list flow for glossary content; and creating a task list flow for library content.

3. The method as defined in claim 1, wherein in performing step b), the method includes the steps of:

collecting information from one or more of the following sources:

field data, published data, survey secondary channels, proprietary data, external resources; and generating a first format for field data, a second format for secondary channels of information, and a third format for published, proprietary and solicited data.

4. A method of using a knowledge management database system, the method comprising the steps of:

a) developing a statement regarding an issue/problem at hand;

b) defining a protostrategy for said statement in terms of risk, time investment and knowledge needed/possessed to address said issue/problem;

c) using the defined protostrategy, determining whether or not to formulate a response to said issue/problem, and stopping the process if it is determined not to respond, otherwise;

d) using the defined protostrategy, taking an action to respond to said issue/problem based on prior knowledge, if available, otherwise;

e) accessing a knowledge management database, using the statement developed in step a) to retrieve pertinent information to develop a response;

f) collecting relevant information from said knowledge management database; and g) determining if sufficient information has been collected to form a response and, if so, forming a response, otherwise;

h) re-accessing at least said knowledge management database to retrieve additional information; and i) using the additional information to formulation at response to the issue/problem.

5. The method as defined in claim 4 wherein subsequent to the formation of a response at steps c), d), g) or ii), performing the steps of:

j) evaluating the effectiveness of the response;

k) adding to the knowledge and experience, familiarity repertoire of the database system;

l) developing or re-defining best known methods for elements related to said problem/issue.

6. The method as defined in claim 4 wherein in performing step e), the initial user performs the access to the database system.

7. The method as defined in claim 4 wherein in performing step e), a proxy is appointed to access the database system and formulate a response to the issue/problem.

8. The method as defined in claim 7 wherein the proxy is defined as a subject matter expert related to the issue/problem.

9. The method as defined in claim 4 wherein in performing step e), a database is accessed which comprises a plurality of separate sections associated with different aspects of the organization.

10. The method as defined in claim 9 wherein the plurality of separate sections includes one or more of the following: a definitions and glossary section; a tools and examples section; an articles and books section; and a rules and regulations section.

11. The method as defined in claim 4 wherein in performing step h), a secondary database is also accessed.

12. The method as defined in claim 11 wherein the secondary database comprises information related to one or more of the following topics relevant to the organization: external services, consultants, professional associations, educational resources and governmental agencies.

13. The method according to claim 4 wherein in performing step h), additional resources outside the database system are accessed to formulate a response.

14. The method as defined in claim 13 wherein the additional resources comprise internal organization resources, resources external to said organization, or both.

15. A knowledge management database system for facilitating the organization learning process, the knowledge management database system comprising:

a common language segment, proving a lexicon for efficiently and accurately searching the remaining segmetns of said knowledge management database system;

a tools and examples segment associated with various types of information stroed in said knowledge management database system;

a reference segment comprising printed information associated with the topics of information stored in said knowledge management database system; and a rules and regulations segment including both internal and governmental rules and regulations associated with the information stored in said knowledge management database system.

16. A knowledge management database system as defined in claim 15 wherein the common language segment includes definitions for terms used in querying the knowledge management database system, alternative terminology related to terms in a query, and a glossary of searchable terms in said knowledge terms in said knowledge management database system.

17. A knowledge management database system as defined in claim 15 wherein the tools and examples segment includes various forms and templates associated with the information stored in the knowledge management database system.

18. A knowledge management database system as defined in claim 15 wherein the tools and examples segment includes sets of questions associated with typical queries submitted to said knowledge management database system, and examples of similar issues and responses.

19. A knowledge management database system as defined in claim 15 wherein the reference segment comprises information from books and articles on topics associated with the information stored in said knowledge management database system.

20. A knowledge management database system as defined in claim 15 wherein the rules and regulations segment includes internal rules associated with the organization utilizing the knowledge management database system.

21. A knowledge management database system as defined in claim 15 wherein the rules and regulations segment includes local, state and federal regulations and laws applicable to the subject matter stored in the knowledge management database system.

22. A knowledge management database system as defined in claim 15 wherein the system includes a validation subsystem for evaluating data items for accuracy and reliability.

23. A knowledge management database system as defined in claim 22 wherein the validation subsystem utilizes a plurality of subject matter experts to review data items.

* * * * *